(No Model.)
E. E. & L. C. BEAUVALET.
ELECTRIC ARC LAMP.
No. 495,772. Patented Apr. 18, 1893.
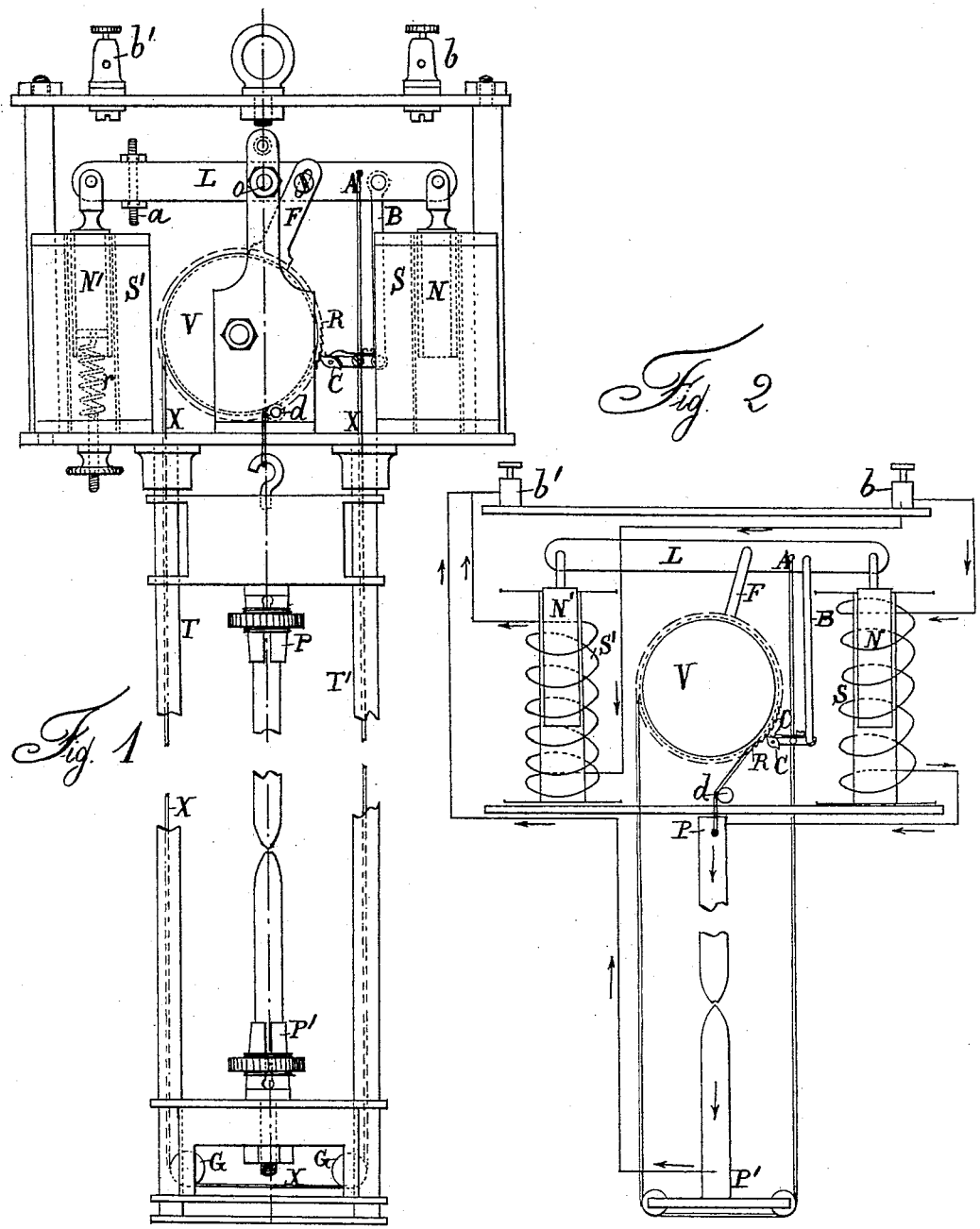
Witnesses:
E. B. Bolton
J. S. Büsing
Inventors:
Ernest Eugène Beauvalet
Léon Charles Beauvalet
By
their Attorneys

UNITED STATES PATENT OFFICE.

ERNEST EUGÈNE BEAUVALET AND LÉON CHARLES BEAUVALET, OF PARIS, FRANCE.

ELECTRIC-ARC LAMP.

SPECIFICATION forming part of Letters Patent No. 495,772, dated April 18, 1893.

Application filed July 11, 1892. Serial No. 439,731. (No model.)

*To all whom it may concern:*

Be it known that we, ERNEST EUGÈNE BEAUVALET and LÉON CHARLES BEAUVALET, residing at Paris, in the Republic of France, have invented new and useful Improvements in Electric-Light Regulators, of which the following is a full, clear, and exact description.

The object of our invention is to provide a differential regulator for electric lights, and consists of certain parts and combinations thereof hereinafter more fully described and claimed.

In order to make our invention more clearly understood we have shown in the accompanying drawings means for carrying the same into practical effect.

In said drawings, Figure 1 is a view of a regulator embodying our invention. Fig. 2 is a detailed view of same.

In our improved device the distance between the carbon points is regulated by the movement of the lever arm L governed by the two cores N and N' which are drawn into the solenoids S and S'.

The two carbon carriers are held by a string, a chain, or any other means of suspension, attached to the superior carbon carrier P, passing over the pulley $d$, around the wheel V which may or may not be toothed, passing over two pulleys G fixed to the lower part of the carbon carrier P', passing up the tube T', and attached at the point A to the lever L. On this same lever L is joined a rod B controlling the pawl C which latter engages the teeth of the ratchet wheel R and holds the wheel V while the brake F takes its place. The stoppage of the wheel V is obtained by means of the brake F wedged on the lever L, and which fastens itself on a smooth periphery arranged for this purpose on the wheel V. The negative and positive carbons are embedded in carbon carriers having special holders. The regulating of the distance for lighting is obtained by means of a peg or abutment $a$ screwed into the lever L and resting upon the solenoid S'. The arc distance while working is regulated by means of a spring $r$ acting either on the core N' of the solenoid S', as shown in Fig. 1, or directly on the lever L.

The operation of the device is as follows: The current arriving by the binding screw $b$ traverses the solenoid S, thence to the carbon carrier P, and from there goes to the lower carbon carrier P' and leaves by the binding screw $b'$. At this time the carbons being in contact the core N is attracted, the pawl C acts on the ratchet R, the brake F applies itself to the wheel V and in consequence of this movement of the lever arm the lower carbon moves away. This brake may in certain parts be omitted without detriment to the action of the regulator. The diminishing intensity in the solenoid S in consequence of the augmentation of the distance of the carbons increases in the solenoid S', the core N' is attracted, and the wheel V is set free.

Having thus described our invention, what we claim as new is—

1. In combination, the carbons, and holders therefor, supporting means, the wheel V having a ratchet the lever L the solenoids for controlling the same, the pawl for operating the ratchet, the bar B for operating the same from the lever L and the cord connected with the upper carbon holder around the wheel V, down under the lower carbon holder and up to the lever L to which it is secured, substantially as described.

2. In combination, the carbon points with their holders, the solenoids the lever L, controlled thereby, the wheel V having a ratchet wheel the pawl and its lever for operating the same, the cord connecting the carbon holders with the wheel V, the brake, both the said brake and the pawl lever being connected to the lever L, to be operated thereby, substantially as described.

3. In an electric lighting device the carbon sticks, holders therefor, means for supporting same, lever arm L, solenoids S S', having cores governing the movement of said lever L, wheel V provided with ratchet wheel R, rod B attached at one end to the lever arm L and provided at its other end with pawl C engaging ratchet wheel R, brake F engaging wheel V, and spring $r$, substantially as described.

4. In an electric lighting device the carbon sticks, holders therefor, means for supporting the same, lever arm L, solenoids S S', having cores governing the movement of said lever L, wheel V provided with ratchet wheel R, rod B attached at one end to the lever arm L and provided at its other end with pawl C engaging ratchet wheel R, brake F engaging wheel V, spring $r$, and peg $a$, substantially as described.

In testimony that we claim the foregoing we have hereunto set our hands this 25th day of May, 1892.

ERNEST EUGÈNE BEAUVALET.
LÉON CHARLES BEAUVALET.

Witnesses:
FRÉDÉRIC MATRAY,
VICTOR MATRAY.